US012584053B2

(12) United States Patent
Carvagno et al.

(10) Patent No.: US 12,584,053 B2
(45) Date of Patent: Mar. 24, 2026

(54) SILANE FUNCTIONALIZED ROSINS

(71) Applicant: Synthomer Adhesive Technologies LLC, Beachwood, OH (US)

(72) Inventors: Terri Roxanne Carvagno, Church Hill, TN (US); Liu Deng, Kingsport, TN (US); Mark Thomas Arigo, Hudson, OH (US); Mark William Ingratta, Copley, OH (US); Michaela Hofbauer, Kingsport, TN (US); Rui Xie, Pearland, TX (US); Stephen Franklin Hatfield, Kingsport, TN (US); Timothy Harold Blayney, Piney Flats, TN (US); Thauming Kuo, Kingsport, TN (US)

(73) Assignee: Synthomer Adhesive Technologies LLC, Beachwood, OH (US)

( * ) Notice: Subject to any disclaimer, the term of this patent is extended or adjusted under 35 U.S.C. 154(b) by 698 days.

(21) Appl. No.: 18/045,090

(22) Filed: Oct. 7, 2022

(65) Prior Publication Data

US 2023/0114977 A1 Apr. 13, 2023

Related U.S. Application Data

(60) Provisional application No. 63/262,259, filed on Oct. 8, 2021, provisional application No. 63/262,261, filed on Oct. 8, 2021.

(51) Int. Cl.

| | |
|---|---|
| ***C09J 193/04*** | (2006.01) |
| ***C08L 93/04*** | (2006.01) |
| ***C09D 193/04*** | (2006.01) |
| ***C09J 167/02*** | (2006.01) |
| *C08G 101/00* | (2006.01) |

(52) U.S. Cl.

CPC ............ *C09J 193/04* (2013.01); *C08L 93/04* (2013.01); *C09D 193/04* (2013.01); *C09J 167/02* (2013.01); *C08G 2101/00* (2013.01)

(58) Field of Classification Search

CPC .................................................. C09J 193/04

See application file for complete search history.

(56) References Cited

U.S. PATENT DOCUMENTS

| | | | |
|---|---|---|---|
| 9,365,751 | B2 | 6/2016 | Suen |
| 10,815,320 | B2 | 10/2020 | Anderson et al. |
| 2022/0049143 | A1 | 2/2022 | Garnier et al. |
| 2023/0123012 | A1 | 4/2023 | Kuo et al. |

FOREIGN PATENT DOCUMENTS

| | | | | | |
|---|---|---|---|---|---|
| CN | 108191905 | A | * | 6/2018 | |
| CN | 112409400 | A | * | 2/2021 | |
| CN | 113248788 | A | * | 8/2021 | |
| EP | 0 601 725 | A1 | | 6/1994 | |
| WO | WO-2012081577 | A1 | * | 6/2012 | ........... B22C 1/2246 |
| WO | 2019/109328 | A1 | | 6/2019 | |
| WO | 2020/128200 | A1 | | 6/2020 | |

OTHER PUBLICATIONS

Machine translation of CN 113248788 A (no date).*
Machine translation of 112409400 A (no date).*
Machine translation of CN 108191905 A (no date).*
DIN53504, Oct. 2009, DIN Deutsches Institut fuer Normung e.V., Berlin, Beuth Verlag GmbH, Germany, pp. 1 to 19.
F1249-13, Standard Test Method for Water Vapor Transmission Rate Through Plastic Film and Sheeting Using a Modulated Infrared Sensor, ASTM Int'l, Nov. 2013, pp. 1 to 6.
PSTC 101, "Peel Adhesion of Pressure Sensitive Tape", Harmonized International Standard, Oct. 2000, revised Oct. 2003 and May 2007, pp. 101-1 to 101-10.
PSTC 107, "Shear Adhesion of Pressure Sensitive Tape", Harmonized International Standard, Oct. 2000, revised Oct. 2003 and May 2007, pp. 107-1-107-11.
Written Opinion and International Search Report dated Jan. 17, 2023 of corresponding international application PCT/US2022/077791.
Written Opinion and International Search Report dated Aug. 11, 2023 of corresponding international application PCT/US2022/077802.
Vevere, L., et al, "A Review of Wood Biomass-Based Fatty Acids and Rosin Acids Use in Polymeric Materials", Polymers 2020, 12, 2706, MDPI, p. 1 to 17.
International Preliminary Report on Patentability dated Apr. 9, 2024 of corresponding international application PCT/US2022/077802.
International Preliminary Report on Patentability dated Apr. 9, 2024 of corresponding international application PCT/US2022/077791.

* cited by examiner

*Primary Examiner* — Marc S Zimmer
(74) *Attorney, Agent, or Firm* — Walter Ottesen, P.A.

(57) ABSTRACT

Disclosed are silane functionalized rosins having multiple functionalities. Such silane functionalized rosins are curable and thus capable of providing unexpected properties for various uses and end products. Also disclosed are synthetic routes to prepare silane functionalized rosins, which are formulated with hydroxyl functional polymers to provide curable adhesive compositions. The adhesives may be used for woodworking, automotive, textile, appliances, electronics, bookbinding, and packaging. Suitable substrates can be metal, polymer film, plastics, wood, glass, ceramic, paper, and concrete.

13 Claims, No Drawings

SILANE FUNCTIONALIZED ROSINS

CROSS REFERENCE TO RELATED APPLICATIONS

This application claims priority of U.S. provisional patent application Nos. 63/262,259, filed Oct. 8, 2021, and 63/262,261, filed Oct. 8, 2021, the entire contents of which are incorporated herein by reference.

BACKGROUND

Sustainability is increasingly valued by both adhesive producers and end users. Consumers and regulations calling for safer, cleaner materials are driving the demand for more environmentally friendly products. Using bio-based materials helps adhesives formulators and brand owners meet sustainability goals, yet there is still a need for new bio-based components such as the silane functionalized rosins of this invention that enable customization of compositions such as thermosetting adhesives to meet various challenges, such as adhesion to difficult-to-bond substrates.

Thermosetting compositions based on isocyanate cross-linkers are widely used for coating and adhesive applications. Such systems are curable at room temperature or low temperatures (e.g. <80° C.) and are capable of providing the desirable properties for a variety of applications. However, there have been increasing health concerns associated with the production and the use of isocyanate compounds and the formulations based on isocyanates. Thus, there is a need for a crosslinking system that is isocyanate free. Since the isocyanate crosslinkers are generally used for low-temperature curing, in order to replace them, the new system must be curable at ambient temperatures. This is particularly challenging because organic reactions generally require the use of heat to overcome the energy that is needed for the reactions to occur.

SUMMARY

This invention provides a novel crosslinking system that is isocyanate free, curable at low temperatures, and is suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

Rosin is a mixture of eight closely related rosin acids characterized by three fused six-carbon rings, double bonds that vary in number and location, and a single carboxylic acid group as illustrated by the representative structure, abietic acid, below. The typical abietic, palustric, and neoabietic types can be converted via disproportionation at high temperature and/or in the presence of catalyst to more stable and more polar dehydroabietic isomers. Fumarated rosin is a cycloaddition product of rosin acid and fumaric acid reacting through their double bonds; it contains a mixture of compounds having mono- and tri-acid functionalities.

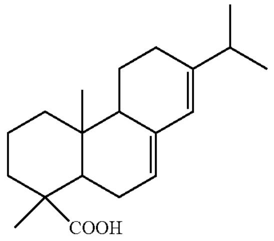

Abietic Acid

Rosin acids, rosin esters and hydrogenated versions of said rosins can be further modified with silane functionality to enable crosslinking in compositions, useful for example as adhesives, sealants, elastomers or coatings.

It is an object to provide a silane functionalized rosin composition, which comprises a compound of Formula 1:

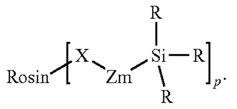

1

In Formula I, X is: (i) at least one heteroatom, or (ii) is either C(O)O or C(O)NH; Z is a linear carbon chain having the formula $(CH_2)_n$, a branched hydrocarbon, a hydroxyl group-substituted hydrocarbon, a divalent ether moiety of the formula $(CH_2)_n$-O—$(CH_2)_n$, or a cycloaliphatic group; each R is independent selected from the group consisting of alkoxy, OH, H, or alkyl, and wherein at least one R is alkoxy or OH on each Si atom; and p is an integer from 1 to 8.

According to the various embodiments, a moiety possessing the structure of Formula 1 is positioned at one or more ends of the silane functionalized rosin, is distributed randomly throughout the silane functionalized rosin, is present in blocks throughout the silane functionalized rosin, is present in segments of the silane functionalized rosin, or is present at least once per silane functionalized rosin.

In various embodiments, the silane functionalized rosin composition is produced by reaction of a carboxyl functionalized rosin and a functional silane. In some embodiments, the carboxyl silane functionalized rosin is a cycloaddition adduct comprising rosin acid residue, a rosin ester, or a mixture thereof, and an ethylenically unsaturated dicarboxylic acid or anhydride and a functional silane.

The cycloaddition adduct is, in some embodiments, the following structure:

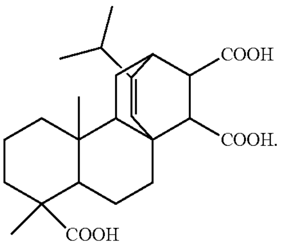 [SMILES: CC(C)C1=CC23CCC4C(C)(C(=O)O)CCCC4(C)C2CC1C(C(=O)O)C3C(=O)O]

In some embodiments, the cycloaddition adduct comprises a rosin ester, wherein the rosin ester is one or more of rosin triethylene glycol ester, rosin glycerol ester, and rosin pentaerythritol ester. In alternative embodiments, the cycloaddition adduct comprises a rosin acid residue, wherein the rosin acid residue is abietic acid, levopimaric acid, or a combination thereof.

In various alternative embodiments the ethylenically unsaturated dicarboxylic acid or anhydride is one or more of fumaric acid, maleic acid, maleic anhydride, dimethyl fumarate, and dimethyl maleate.

In various alternative embodiments the silane functionalized rosin is selected from: a) one or more of 3-glycidoxypropyltriethoxysilane, am inomethyltrimethoxysilane, 3-am inopropyltrimethoxysilane, 3-aminoisobutyltrimethoxysilane, 2-hydroxyethyltrimethoxysilane, and 2-(3,4-epoxycyclohexyl)ethyl-trimethoxysilane, or b) an alkoxysilane compound comprising one or more glycidyl, epoxy, amino, or hydroxyl functionalities.

In certain embodiments, the silane functionalized rosin comprises about 4 to about 70 weight percent of the silane functionalized rosin, about 10 to about 90 weight percent of at least one polymer, about 0 to about 70 weight percent of at least one thermoplastic tackifying resin, about 0 to about 50 weight percent of at least one wax, about 0 to about 60 weight percent of at least one oil or plasticizer, about 0.5 to about 3 weight percent of at least one stabilizer, and about 0 to about 70 weight percent of at least one filler.

In some embodiments, the silane functionalized rosin is vulcanized. In some embodiments, the silane functionalized rosin is cured. In some embodiments, the silane functionalized rosin further comprises an organic solvent.

In other embodiments, silane functionalized rosin composition comprises: (A) from about 10% to about 60% based on the weight of the composition of at least one isocyanate; (B) about 10% to about 60% based on the weight of the composition of the silane functionalized rosin; (C) about 10% to about 80% based on the weight of the composition of at least one polyester or polyether polyol or a mixture thereof; (D) from 0% to about 10% based on the weight of the composition of a blowing agent; (E) from 0% to about 5% based on the weight of the composition of a surfactant; and (F) from about 0.02% to about 5.0% based on the weight of the composition of a urethane catalyst.

In other alternative embodiments, the silane functionalized rosin further comprises an hydroxyl functional polymer having a hydroxyl number of 10 mgKOH/g to 200 mgKOH/g and a number average molecular weight of 500 g/mol to 10,000 g/mole, and in other such embodiments, forms an Si—O—C covalent bond with the hydroxyl functional polymer upon curing.

In certain embodiments, the silane functionalized rosin possesses a peel strength of 5 N/25 mm or greater, as measured in accordance with ASTM D1876 (T-peel test) or ISO 4587, and/or a lap shear strength of 1 N/mm2 or greater as measured in accordance with ASTM D1002, after having been fully cured between two substrates.

In various alternative embodiments, the silane functionalized rosin comprises a hydroxyl functional polymer that is present in an amount of between 30 and 90 weight %, and in such embodiments the silane functionalized rosin is present in an amount of between 10 and 70 weight %, based on the total weight of the composition. In other embodiments, the hydroxyl functional polymer is one or more of polyester polyol, polyether polyol, and acrylic polyol.

In particular alternative embodiments, the silane functionalized rosin has the structure of Formula II or Formula III:

Formula II

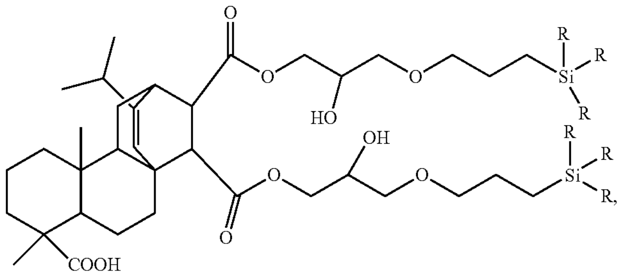

2

-continued

Formula III

3

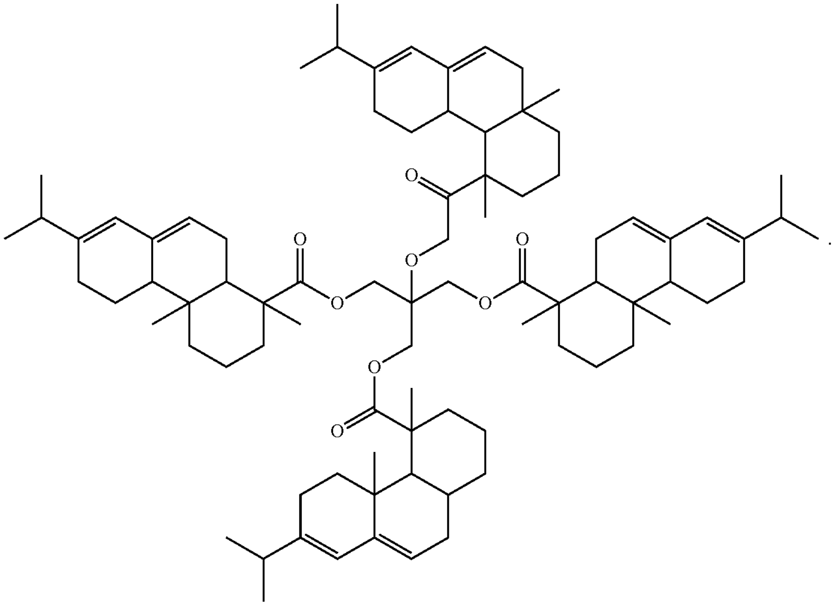

DETAILED DESCRIPTION

In one embodiment of the invention, there is provided a functionalized rosin comprising a compound of formula 1:

1

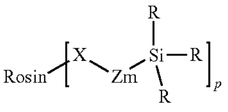

X is (i) a heteroatom, or (ii) either C(O)O or C(O)NH, Z is a linear carbon chain having the formula $(CH_2)_n$, a branched hydrocarbon, a hydroxyl group-substituted hydrocarbon, a divalent ether moiety of the formula $(CH_2)_n$-O—$(CH_2)_n$, or a cycloaliphatic group; each R is independent selected from the group consisting of alkoxy, OH, H, or alkyl, and wherein at least one of R is alkoxy or OH on each Si atom; each n is an integer of 2 to 4; and p is an integer of from 1 to 8.

In some embodiments of the invention, said formula 1 moiety is positioned at one or more ends of the functionalized rosin, is distributed randomly throughout the functionalized rosin, is present in blocks throughout the functionalized rosin, is present in segments of the functionalized rosin, is present at least once per functionalized rosin, is present at least twice per functionalized rosin, and/or is present in the middle of each functionalized rosin.

In another embodiment of the invention, there is provided a silane functionalized rosin, which is the reaction product of the reactants comprising:

a. a carboxyl functional rosin, which is the cycloaddition adduct comprising the residues of
   i. a rosin acid, or a rosin ester, or a mixture thereof and
   ii. an ethylenically unsaturated dicarboxylic acid or anhydride, and
b. a functional silane.

Said carboxyl functional rosin (a) is the cycloaddition adduct prepared by reacting a rosin acid, a rosin ester, or a mixture thereof with an ethylenically unsaturated dicarboxylic acid or its anhydride through its double bond by means of Diels-Alder reaction. The following is a representative structural formula of the cycloaddition rosin adduct:

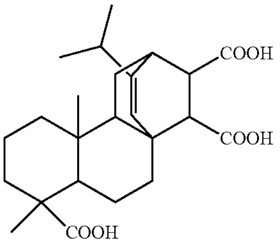 [SMILES: CC(C)C1=CC23CCC4C(C)(C(=O)O)CCCC4(C)C2CC1C(C(=O)O)C3C(=O)O]

Said rosin acid (i) can be derived from any of the three sources of naturally occurring rosins: gum rosin, wood rosin and tall oil rosin. Gum rosin can be obtained from the oleoresin of a living pine tree, and wood rosin can be harvested from the heartwood of an aged stump of a felled pine tree. Tall oil rosin can be obtained by distillation of crude tall oil (CTO), a by-product of the kraft sulphate pulping process. CTO can typically contain 70-90 percent acidic material, while rosins derived from oleoresin and aged stump wood can typically comprise approximately 90 percent rosin acids.

Rosin acids are monocarboxylic acids having molecular formula $C_{19}H_{29}COOH$. Naturally occurring rosins contain two types of rosin acids: abietic and pimaric types. The abietic-type includes abietic acid, levopimaric acid, neoabietic acid, palustric acid, and dehydroabietic acid. The pimaric type includes pimaric acid, isopimaric acid, and sandaracopimaric acid. Only the abietic-type rosin acids can react in a Diels-Alder reaction manner. Thus, the cycloaddition rosin adduct (a) used for the preparation of the silane functionalized rosin of the present invention is a mixture of the cycloaddition rosin adducts and unreacted rosin acids.

In one embodiment, the rosin acid component (i) of the silane functionalized rosin of the present invention comprises one or more compounds selected from the group consisting of abietic acid, levopimaric acid, neoabietic acid, palustric acid, and dehydroabietic acid.

The chemical structures of the two representative rosin acids, abietic acid and levopimaric acid are illustrated below:

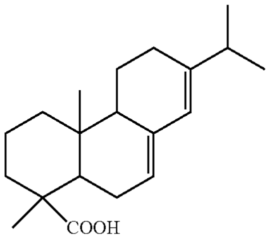

Abietic Acid

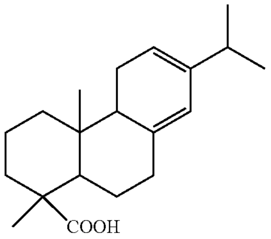

Levopimaric acid

Examples of the ethylenically unsaturated dicarboxylic acid suitable for this invention include fumaric acid, maleic acid, maleic anhydride, dimethyl fumarate, dimethyl maleate, and the like.

An example of a silane functionalized rosin is depicted in formula 2 below, which is prepared by reacting a fumarated rosin with 3-glycidoxypropyl-triethoxysilane, wherein each R is ethoxy group.

2

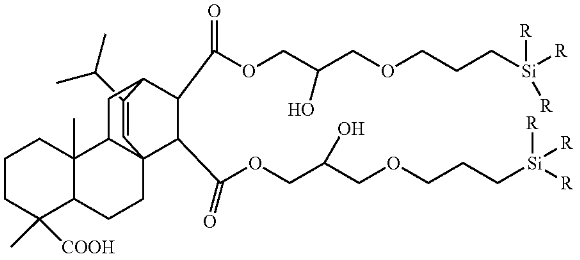

Alternatively, a rosin ester can be used in lieu of rosin acid (i) to react with said ethylenically unsaturated dicarboxylic acid (ii) to yield an adduct having two or more carboxyl functional groups depending on the types of rosin esters used. Rosin esters are prepared by reacting rosin acid with an alcohol or polyol, desirably having 2, 3, or 4 hydroxyl groups. Examples of such polyols include triethylene glycol, glycerol, trimethylolpropane, and pentaerythritol. Examples of rosin esters include rosin triethylene glycol ester, rosin glycerol ester, and rosin pentaerythritol ester. Formula 3 shows a representative chemical structure of rosin pentaerythritol ester prepared by reacting rosin acid with pentaerythritol.

3

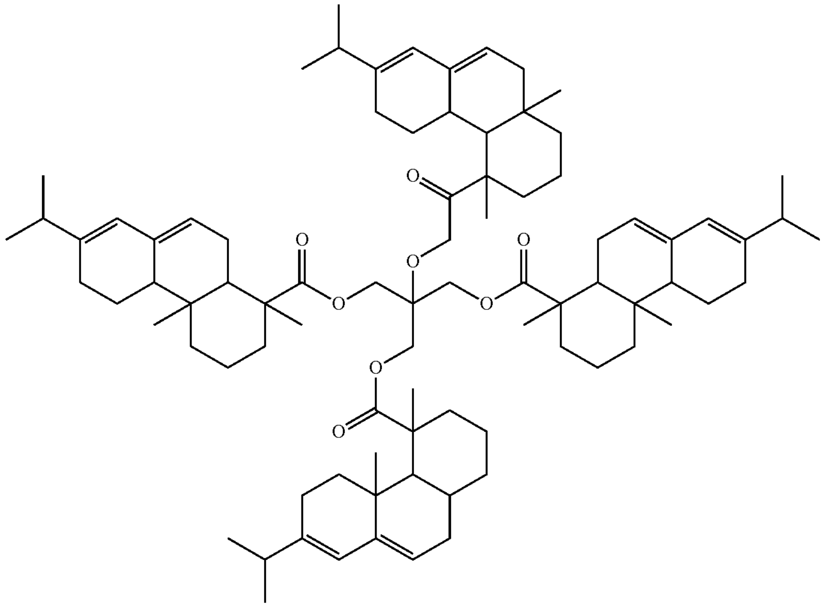

Rosin esters suitable for this invention include monoester of rosin acid, diester of rosin acid, triester of rosin acid, tetraester of rosin acid, and mixtures thereof. In one embodiment, either the starting rosin or the esterification product thereof has undergone disproportionation. Disproportionation is readily achieved by known disproportionation catalysts that are commonly used in the rosin esterification art. Exemplary disproportionation catalysts include, but are not limited to, supported metal catalysts such as rhodium on carbon, platinum on carbon, and palladium on carbon. Metal powder may also serve as a disproportionation catalyst, where exemplary metal powders include, but are not limited to, platinum, nickel, iodide and metal iodides such as iron iodide. These disproportionation catalysts are readily available from many commercial suppliers, for example, Aldrich Chemical Co. (Milwaukee, Wis.). They are typically used at a concentration of 0.01-5% by weight compared to the total weight of the rosin and polyol, and are preferably used at a concentration of 0.01 to 1% by weight.

Silane functionalized rosins of this invention prepared by using rosin esters instead of rosin acid are advantageous in that they exhibit more than two silane functionalities capable of providing more effective crosslinking. Thus, in a further embodiment this invention provides a silane functionalized rosin having two or more silane functional groups. In some embodiments, the silane functionalized rosin has 2, 3, 4, 5, 6, 7, or 8 silane functional groups.

Examples of said functional silane (b) include one or more selected from the group comprising 3-glycidoxypropyltriethoxysilane, 3-glycidoxypropyltrimethoxysilane, aminomethyltriethoxysilane, aminomethyltrimethoxysilane, 3-aminopropyltriethoxysilane, 3-aminopropyltrimethoxysilane, 3-aminoisobutyltriethoxysilane, 3-aminoisobutyltrimethoxysilane, 2-hydroxyethyltriethoxysilane, 2-hydroxyethyltrimethoxysilane, 2-(3,4-epoxycyclohexyl) ethyltriethoxysilane, 2-(3,4-epoxycyclohexyl) ethyltrimethoxysilaneethyl-trimethoxysilane, and other alkoxysilane compounds having glycidyl, epoxy, amino, or hydroxyl functionalities.

Methods for the preparation of silane functionalized resins using carboxyl functional resins has been disclosed in U.S. Pat. No. 10,815,320 B2, the content of which is incorporated herein in its entirety.

The silane functionalized rosin of this invention can be incorporated into various chemical compositions with numerous applications. The chemical compositions are, for example, solvent borne, waterborne, emulsions, 100% solids, or hot melt compositions and/or adhesives.

Thus, in some embodiments, this invention provides a composition comprising:

about 4 to about 70 weight percent of at least one silane functionalized rosin of this invention, about 10 to about 90 weight percent of at least one polymer, about 0 to about 70 weight percent of at least one thermoplastic tackifying resin, about 0 to about 50 weight percent of at least one wax, about 0 to about 60 weight percent of at least one oil or plasticizer, about 0.5 to about 3 weight percent of at least one stabilizer, and about 0 to about 70 weight percent of at least one filler.

wherein the composition can be vulcanized or non-vulcanized.

Suitable polymer, thermoplastic tackifying resin, wax, plasticizer, stabilizer, and filler components in said composition have been described in U.S. Pat. No. 10,815,320 B2, the content of which is incorporated herein in its entirety.

The silane functionalized rosin of this invention can also be used as a crosslinker for polyols, such as polyester polyol, polyether polyol, and acrylic polyol to provide a curable composition. One end use of the curable composition is for adhesive applications.

Thus, in a further embodiment of this invention, there is provided a curable adhesive composition comprising:

a. a hydroxyl functional polymer and b. a silane functionalized rosin of this invention wherein said hydroxyl functional polymer has a hydroxyl number of 10-200 mgKOH/g and number average molecular weight of 500-10,000 g/mole, and wherein the silane functionalized resin formed a Si—O—C covalent bond with the hydroxyl functional polymer upon curing of said adhesive.

In another embodiment, said hydroxyl functional polymer (a) is in an amount of 30-90 weight % and said silane functionalized rosin (b) is in an amount of 10-70 weight %, based on the total weight of (a) and (b). In some embodiments, the hydroxyl functional polymer is in 40-80, 50-80, 60-80, 70-80, 50-70, or 50-60 weight % and the silane functionalized rosin is in 20-60, 20-50, 20-40, 20-30, 30-50, or 40-50 weight %.

Desirably, the equivalent ratio of hydroxyl (OH) and silane functionalities is OH/silane=0.7 to 1.3, 0.8 to 1.2, 0.9 to 1.1, or 0.95 to 1.05.

Silane functionalized rosins having 2 or more silane groups are particularly suitable for the curable composition of the invention as they can provide more reactive sites for effective crosslinking.

The curing of the adhesive composition is triggered by the hydrolysis of the alkoxy groups on the silane group to yield silanol groups, which then undergo condensation reaction either with the hydroxyl groups on the hydroxyl functional polymer to form Si—O—C covalent bonds or with other silanol groups to form Si—O—Si covalent bonds. The curing can occur at room temperatures over time in the presence of moisture in air. The curing can also be accelerated by heat and/or by adding a catalyst for the hydrolysis and condensation reactions and/or by adjusting the pH of the formulation.

In another embodiment, a composition suitable for preparing urethane prepolymers, urethane foams, or non-foam urethanes for use in coatings, adhesives, sealants or elastomers, comprises: (A) from about 10% to about 60% based on the weight of the composition of at least one isocyanate; (B) about 10% to about 60% based on the weight of the composition of at least one silane functionalized rosin; (C) about 10% to about 80% based on the weight of the composition of at least one polyester or polyether polyol or a mixture thereof; (D) from 0% to about 10% based on the weight of the composition of a blowing agent; (E) from 0% to about 5% based on the weight of the composition of a compatibilizing surfactant; and (F) from about 0.02% to about 5.0% based on the weight of the composition of a urethane catalyst. Such hybrid (dual) cure system can crosslink through both isocyanate and silane functional groups and impart unique properties, such as, but not limited to, broad substrate compatibility, tolerance of application environment, improved cohesion, improved resistance to solvents and chemicals.

When fully cured between two substrates, the adhesive of the invention can have a peel strength of 5 N/25 mm or greater as measured in accordance with ASTM D1876 (T-peel test) (suitable for flexible substrates) or ISO 4587, or a lap shear strength of 1 $N/mm^2$ or greater as measured in accordance with ASTM D1002 (suitable for rigid substrates).

In some embodiments, the adhesive of the invention can have a peel strength of 5, 10, 20, 30, 40, or 50 N/25 mm or greater as measured in accordance with ASTM D1876 (T-peel test) (suitable for flexible substrates) or ISO 4587, or a lap shear strength of 1, 5, 10, 20, 30, 40, or 50 $N/mm^2$ or greater as measured in accordance with ASTM D1002 (suitable for rigid substrates).

Adhesive compositions described herein may exhibit unique and desirable properties such as, for example, improved cure time, green bond strength, solvent resistance, chemical resistance, hydrolytic stability, thermal stability, impact resistance, weatherability, improved applicability, as compared to conventional adhesive compositions that do not contain the inventive silane functionalized rosin. Such adhesive compositions as described herein may be of several types and may be suitable for a wide array of end uses, such as, for example, flexible packaging, automotive, building and construction, wood working, assembly adhesives, wood adhesives, electronic component adhesives, and potting compounds for electronics.

Examples of said hydroxyl functional polymer (a) include polyester polyol, polyether polyol, acrylic polyol, and mixtures thereof. Polyester polyol includes a diol component and a diacid component, and optionally a polyol component. The diol has 2 hydroxyl groups and can be branched or linear, saturated or unsaturated, aliphatic or cycloaliphatic $C_2$-$C_{20}$ compounds, the hydroxyl groups being primary, secondary, and/or tertiary. Examples of diols include 2,2,4,4-tetramethyl-1,3-cyclobutanediol (TMCD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid (dimethylolpropionic acid).

Desirably, the diol is selected from 2,2,4,4-tetramethyl-1,3-cyclobutanediol (TMCD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof.

The polyol having 3 or more hydroxyl groups can be branched or linear, saturated or unsaturated, aliphatic or cycloaliphatic $C_2$-$C_{20}$ compounds, the hydroxyl groups being primary, secondary, and/or tertiary, and desirably at least two of the hydroxyl groups are primary. Desirably, the polyols are hydrocarbons and do not contain atoms other than hydrogen, carbon and oxygen. Examples of the polyol include 1,1,1-trimethylolpropane (TMP), 1,1,1-trimethylolethane, glycerin, pentaerythritol, erythritol, threitol, dipentaerythritol, sorbitol, mixtures thereof, and the like. Desirably, the polyol is TMP.

The diacid may be a dicarboxylic acid compound, a derivative of dicarboxylic acid compound, or a combination thereof. In one aspect, the dicarboxylic acid compound comprises a dicaraboxylic acid compound having two carboxylic acid groups, derivatives thereof, or combinations thereof, capable of forming an ester linkage with a hydroxyl component. For example, a polyester can be synthesized by using a dihydroxyl compound and a derivative of a dicarboxylic acid such as, for example, dimethyl ester or other dialkyl esters of the diacid, or diacid chloride or other diacid halides, or acid anhydride. Examples of dicarboxylic acids that may be used include aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, dimer acid, hydrogenated dimer acid, 2,6-naphthalenedicarboxylic acid, glutaric acid, itaconic acid, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

The hydroxyl number of the polyester suitable for the present invention is from about 10 to about 200, from about 30 to about 180, or from about 50 to about 150 mgKOH/g. The acid number is from 0 to about 30, from about 0 to about 20, from 0 to about 10, or from 0 to about 5 mgKOH/g.

The number average molecular weight (Mn) of the polyester suitable for the present invention may be from 500 to 10,000, from 800 to 6,000, or from 1,000 to 3,000 g/mole. The weight average molecular weight (Mw) of the polyester may be from 1,000 to 100,000, from 1,500 to 50,000, or from 2,000 to 10,000 g/mole. Molecular weights are measured by gel permeation chromatography (GPC) using polystyrene equivalent molecular weight.

The glass transition temperature (Tg) of the polyester suitable for the present invention may be from −70° C. to 120° C., from −60° C. to −20° C., from −40° C. to −10° C., from −30° C. to 10° C., from −10° C. to 20°, from 0° C. to 30° C., from 20° C. to 50° C., from 30° C. to 60° C., from 40° C. to 70° C., from 50° C. to 80° C., or from 60° C. to 100° C.

Additionally, or in the alternative, the adhesive composition may comprise at least one polyether polyol. Examples of suitable polyether polyols include, but are not limited to, Voranol 2120 and 2000LM (commercially available from Dow Chemical). In some embodiments, the polyether polyol may be used in an amount of 0, or at least about 5, at least about 10, at least about 15, at least about 20, at least about 25, at least about 30, at least about 35 and/or not more than about 55, not more than about 50, not more than about 45, not more than about 40, not more than about 35, not more than about 30, or not more than about 25 weight percent, based on the total weight of the composition.

Additionally, or in the alternative, the adhesive composition may further comprise one or more reactive or non-reactive vinyl polymers to further improve the desirable properties such as cure time, bond strength, cohesion, and mechanical strength. Examples of such vinyl polymers include homopolymers and copolymers of ethylenically unsaturated monomers selected from the group comprising methyl acrylate, methyl methacrylate, ethyl acrylate, ethyl methacrylate, butyl acrylate, butyl methacrylate, isobutyl acrylate, isobutyl methacrylate, 2-ethylhexyl methacrylate, 2-ethylhexyl acrylate, isoprene, octyl acrylate, octyl methacrylate, iso-octyl acrylate, iso-octyl methacrylate, isobornyl (meth)acrylate, cyclohexyl (meth)acrylate, hydroxymethyl (meth)acrylate, hydroxyethyl (meth)acrylate, hydroxypropyl (meth)acrylate, hydroxylbutyl (meth)acrylate, acetoacetoxy ethyl methacrylate, acetoacetoxy ethyl acrylate, methyl 2-(hydroxymethyl)acrylate, ethyl 2-(hydroxymethyl)acrylate, isopropyl 2-(hydroxymethyl)acrylate, n-butyl 2-(hydroxym ethyl)acrylate, t-butyl 2-(hydroxymethyl)acrylate, vinyl ester such as vinyl acetate, vinyl alcohol, vinyl ether, styrene, alkylstyrene, butadiene, and acrylonitrile. The reactive vinyl polymers can have functionalities such as, for example, hydroxyl, acetoacetate, and carbamate. The vinyl polymers may be used in various adhesive formulations including solvent-borne, solventless, and hot melt types.

The adhesive composition may also include one or more other components such as, for example, a tackifier. The tackifier may help improve the adhesive properties, including but not limited to the viscosity, wetting behavior, green strength, adhesion, particularly to low energy surfaces, and viscoelastic behavior of the adhesive composition. The tackifier resin selected may vary depending on the exact curable composition and the balance of properties needed in an application, such as peel strength, shear strength, and tack.

Tackifier resins that may be present in the adhesive compositions described herein may include, but are not limited to, cycloaliphatic hydrocarbon resins, C5 hydrocarbon resins, C5/C9 hydrocarbon resins, aromatically modified C5 resins (commercially available as Piccotac™ resins, Eastman Chemical Company, TN, US), C9 hydrocarbon resins (commercially available as Picco™ resins, Eastman), pure monomer resins (e.g., copolymers of styrene with alpha-methyl styrene, vinyl toluene, para-methyl styrene) (commercially available as Kristalex™ resins, Eastman), DCPD resins, dicyclopentadiene based/containing resins, cyclo-pentadiene based/containing resins, terpene resins (commercially available as Sylvares™ resins, AZ Chem Holdings, LP, Jacksonville, Fla., US), terpene phenolic resins, terpene styrene resins, esters of rosin (commercially available as Permalyn™ resins, Eastman), esters of modified rosins, liquid resins of fully or partially hydrogenated rosins, fully or partially hydrogenated rosin (commercially available as Staybelite™, Foral™ and Foralyn™ resins, Eastman), fully or partially hydrogenated rosin acids (commercially available as Staybelite™, Foral™ and Foralyn™ resins, Eastman), fully or partially hydrogenated modified rosin resins, fully or partially hydrogenated rosin alcohols, fully or partially hydrogenated C5 resins, fully or partially hydrogenated C5/C9 resins, fully or partially hydrogenated DCPD resins (commercially available as Escorez™ 5000-series resin, ExxonMobil Chemical Company, TX, US), fully or partially hydrogenated dicyclopentadiene based/containing resins, fully or partially hydrogenated cyclo-pentadiene based/containing resins, fully or partially hydrogenated aromatically modified C5 resins, fully or partially hydrogenated C9 resins (commercially available as Regalite™ resins, Eastman), fully or partially hydrogenated pure monomer resins (e.g., copolymers or styrene with alpha-methyl styrene, vinyl toluene, para-methyl styrene) (commercially available as Regalrez™ resins, Eastman), fully or partially hydrogenated C5/cycloaliphatic resins (commercially available as Eastotac™ resins, Eastman), fully or partially hydrogenated C5/cycloaliphatic/styrene/C9 resins, fully or partially hydrogenated cycloaliphatic resins, and mixtures thereof.

When present, the tackifier may also include, for example, rosin esters, such as glycerol rosin ester, pentaerythritol rosin ester, and hydrogenated rosin resins, and hydrocarbon resins.

In some embodiments, the adhesive of the present invention may further comprise one or more catalysts or activating agents selected from the group comprising Brönstedt and/or Lewis acids, such as acetic acid, dibutyltin oxide, butylstannoic acid, dibutyltin dilaurate, dibutyltin diacetylacetonate, bismuth carboxylate, zinc oxide, titanium (IV) oxide, titanium acetylacetonate, and basic catalysts such as triethylamine and ammonium hydroxide.

The adhesive of the invention may further comprise a solvent. Examples of suitable solvents include, but are not limited to, ethyl acetate, n-butyl acetate, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, ethyl-3-ethoxypropionate, xylene, toluene, acetone, methyl amyl ketone, methyl isoamyl ketone, methyl ethyl ketone, cyclopentanone, and cyclohexanone.

When a solvent is present, the adhesive may have a solids content of at least about 10, at least about 15, at least about 20, at least about 25, at least about 30, at least about 35, at least about 40, or at least about 45 weight percent and/or less than about 90, not more than about 85, not more than about 80, not more than about 75, not more than about 70, not more than about 65, not more than about 60, not more than about 55, not more than about 50, or not more than about 45 percent, based on the total weight of the adhesive composition.

In some embodiments, the adhesive composition can be a hot melt adhesive. When the adhesive is a hot melt, it may comprise a solventless or solid composition and may be heated during all or a portion of its application. When the adhesive composition is solventless, it may have a solids content of at least about 90, at least about 92, at least about 95, at least about 97, at least about 99, or at least about 99.5 weight percent, based on the total weight of the adhesive. Solventless adhesives may be in the form of pellets, powders, sticks, or other masses solid at room temperature and pressure.

When the adhesive composition is a hot melt adhesive, it may be applied by heating the adhesive to a temperature of at least about 50, at least about 55, at least about 60, at least about 65, at least about 70, at least about 75, at least about 80, at least about 85, at least about 90, at least about 95, at least about 100, at least about 105, at least about 110, at least about 115, at least about 120, at least about 125, at least about 130, at least about 135, or at least about 140° C. and/or not more than about 200, not more than about 195, not more than about 190, not more than about 185, not more than about 180, not more than about 175, not more than about 170, not more than about 165, not more than about 160, not more than about 155, or not more than about 150° C. Hot melt adhesive compositions according to embodiments of the invention can be single component or two-component adhesives. Typical methods of applying the hot melt adhesive include, but are not limited to, a roll coater, sprayer, or a glue gun.

Adhesive compositions as described herein may have enhanced properties as compared to adhesives formulated with conventional polyols. For example, adhesive compositions according to embodiments of the present invention may have both greater initial bond strength (offline bond strength), as well as higher levels of both thermal and chemical resistance. This makes the adhesives suitable for a variety of end use applications, from woodworking to electronics to flexible packaging and automotive bonding. Such adhesives exhibit high offline bond strength, quickly reach substrate failure, have a high chemical and thermal resistance.

In some embodiments, adhesive compositions as described herein may have an offline bond strength in the range of from 100 to 1000 grams per 25 mm. Offline Bond Strength is measured according to ASTM F904-16 immediately after lamination. The offline bond strength exhibited by the present invention can be at least about 150, at least about 200, at least about 250, at least about 300, at least about 350, at least about 400, at least about 450, at least about 500, or at least about 550 and/or not more than about 1000, not more than about 950, not more than about 900, not more than about 850, not more than about 800, not more than about 750, not more than about 700, not more than about 650, or not more than about 600 g/25 mm.

According to embodiments of the present invention, there is provided a method of using the adhesive compositions described herein. The method comprises contacting a surface of at least one layer or substrate with at least a portion of an adhesive composition, then adhering another layer or substrate to the first via the adhesive layer. The adhesive composition used to form the adhesive layer may be any adhesive composition as described herein or can be a composition comprising the inventive silane functionalized rosin.

Additionally, there is provided a laminated article formed from an adhesive described herein comprising a first substrate presenting a first surface, a second substrate presenting a second surface, and an adhesive layer disposed between and at least partially in contact with at least one of the first and second surfaces. Each of the first and second layers may comprise a material selected from the group, but not limited to, consisting of polyethylene terephthalate, polypropylene, aluminum-coated or aluminum-laminated polyethylene terephthalate, low density polyethylene, and combinations thereof. In some cases, the first and second layers may be the same, while, in other embodiments, the first and second substrates or layers may be different (or formed from different materials).

In some embodiments, one or both of the first and second layers may have a thickness of at least about 0.5, at least about 1, at least about 1.5, or at least about 2 mil (1 mil=25 μm) and/or not more than about 10, not more than about 8, not more than about 5, not more than about 3, not more than about 2, or not more than about 1.5 mil. The laminated article may further comprise a third, fourth, fifth, or even sixth layer, each separated from and in contact with, at least one additional adhesive layer, at least one of which is formed from a composition comprising the inventive silane functionalized rosin.

In some embodiments, the laminated article, or film, may be used to form another article such as, for example, a package, pouch, bag, or other type of container for holding and storing at least one substance, such as, for example, an edible item. The package, pouch, bag, or other container may then be filled with at least one substance, such as, for example, a foodstuff, beverage, or other edible substance, which can then be sealed within the interior volume of the package. As discussed previously, such a package may exhibit enhanced chemical and thermal resistance to delamination or other types of failure, due to the enhanced performance of the adhesive used to form the laminate.

In another embodiment, there is provided a laminated article comprising a first substrate presenting a first surface, a second substrate presenting a second surface, and an adhesive layer disposed between and in contact with at least a portion of the first and second surfaces. The substrates may be selected from the group consisting of polymers (including, but not limited to, polymeric foams and thicker or rigid polymeric substrates such as polycarbonate), wood, metal, fabric, leather, and combinations thereof. The first and second substrates may be formed from the same material or each may be formed from a different material.

In some embodiments, the first and second substrates may have different thicknesses such that, for example, one substrate is relatively thick (e.g., 6 mm or more), while the other is relative thin (e.g., not more than 0.75 mm). Such differences in thickness may occur when, for example, an adhesive composition is used to adhere an outer decorative or functional layer to a base substrate. In some cases, the ratio of the thickness of the thinner substrate to the thicker substrate can be at least about 0.0001:1, at least about 0.0005:1, at least about 0.001:1, at least about 0.005:1, at least about 0.01:1, at least about 0.05:1, at least about 0.1:1, at least about 0.5:1, or at least about 0.75:1.

Examples of suitable end use applications for adhesives as described herein can include, but are not limited to, woodworking, automotive, textile, appliances, electronics, bookbinding, and packaging. Suitable substrates can be polymer film, plastics, wood, glass, ceramic, paper, and concrete.

In various embodiments, the curable adhesive compositions can be applied in the range of about 0.5 gsm to about 200 gsm (gsm=grams per square meter). In embodiments where the curable composition will be used to bond substrates to each other, the add-on rate used will be suitable for generating laminates or composites with the desired bond strength. The curable composition can be applied to one or both substrates before the substrates are brought into contact to form a composite, laminate or article. The article so formed may be optionally contacted with additional substrates, additional curable compositions, adhesives, and/or may be subjected to applied pressure and/or applied heat, in any order or combination without limitation.

In one embodiment of the invention, there is provided a process for preparing and curing a reactive adhesive comprising preparing a composition of the invention for a reactive adhesive and applying heat from an external source at a temperature above or at ambient temperature to said composition, whereby polymerization is initiated.

In one embodiment of the invention, there is provided a process for forming a laminate structure, comprising the following steps: (1) forming an adhesive composition by combining the three components of any of the compositions of the invention; (2) applying the adhesive composition to a surface of a first substrate; thereby forming the laminate structure.

In one embodiment, an article of manufacture is provided comprising at least one flexible substrate coated with at least one composition of the invention.

In one embodiment, an article of manufacture is provided comprising at least two substrates wherein said substrates comprise flexible film and wherein between said substrates of flexible film is at least one of the compositions of the invention which has cured.

In one embodiment of the invention, the article of manufacture of the invention can be a laminated structure.

In one embodiment of the invention, there is provided a process wherein at least one adhesive composition of the invention can be applied to a first substrate and a second substrate which can be each independently selected from the group consisting of a wood material, a metallic material, a plastic material, an elastomeric material, a composite material, a paper material, a fabric material, a glass material, a foamed material, a metal, a mesh material, a leather material, a synthetic leather material, a vinyl material, poly (acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material, or combinations of two or more thereof.

In one embodiment of this invention, there is provided a process wherein at least one composition of the invention can be applied to a first substrate and, optionally, can be applied to a second substrate wherein a first substrate and a second substrate can be each independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wovens, and/or nonwovens; foam materials; leather materials; vinyl materials; and/or others that would be apparent to one of ordinary skill in the art. These materials can be used with or without fillers such as talc, glass, etc. as described herein.

In one embodiment of the invention, there is process wherein at least one adhesive composition of the invention can be applied to a first substrate and, optionally, can be applied to a second substrate and can be each independently selected from a polyester composite, a glass composite, or a wood-plastic composite.

In one embodiment of the invention, there is provided a process wherein at least one adhesive composition of the invention can be applied to a first substrate and, optionally, can be applied to a second substrate which are each independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LDPE), oriented polypropylene, biaxially oriented polypropylene (BOPP), nylon, ethylene vinyl alcohol, and extruded films.

In one embodiment, there is provided an article of manufacture comprising at least one composition of the invention and/or processed by any of the processes of the invention.

In one embodiment, there is provided an article of manufacture comprising at least one composition of the invention and further comprising one or more substrates, e.g., flexible substrates, assembly part substrates, automobile interior substrates, woodworking substrates, furniture part substrates, etc. "Flexible substrate" is defined herein as a substrate that is less than 10 mil thick.

In one embodiment, there is provided an article of manufacture comprising at least two substrates wherein at least one composition of the invention is applied to the first substrate and wherein the second substrate can be contacted with said composition.

In one embodiment, there is provided an article of manufacture which is layered with multiple substrates wherein at least one composition of the invention is layered between at least two of said substrates.

In one embodiment, there is provided an article of manufacture comprising at least one composition of the invention which is a laminate structure.

In one embodiment, there is provided an article of manufacture wherein at least one composition of the invention is applied to at least one surface of a multi-laminated structure.

In one embodiment, there is provided an article of manufacture comprising at least one composition of the invention selected from the group consisting of: an adhesive, a laminate, a tape, a label, a tag, a radio frequency identification (RFID) tag, a coating, a sealant, a film (whether or not flexible), a foam, a potting compound, a disposable hygiene article, a polyester composite, a glass composite, a fiberglass reinforced plastic, a wood-plastic composite, an extruded compound, a polyacrylic blended compound, a potting compound, a rubber compound, a motor vehicle molded part, a motor vehicle extruded part, a motor vehicle laminated part, a furniture part, sheet molding compound (SMC), dough molding compound (DMC), textiles (e.g. fabric materials, mesh, wovens and/or nonwovens) and/or a flexible packaging multilayer.

In one embodiment, the substrates used in the articles of manufacture of the invention can be flexible film substrates comprising at least one composition of the invention.

In one embodiment, the articles of manufacture of the invention can be assembly parts including but not limited to automobile parts, woodworking parts, and/or furniture parts comprising at least one composition of the invention.

In one embodiment, the article of manufacture of the invention can comprise an adhesive. The adhesive compositions of the invention can comprise any one of the compositions of the invention. In one embodiment, the adhesive compositions of the invention can be reactive adhesives. In one embodiment, the adhesive compositions of the invention can be curable or cured.

In one embodiment, any of the adhesive compositions of the invention can be applied to a substrate at any thickness known in the art for a particular application, for example, from about 0.5 microns to about 50 microns, or from about 0.5 microns to 5 microns, for example, for some flexible packaging applications.

In one embodiment, any of the adhesive compositions of the invention can be applied to a substrate at any thickness known in the art for a particular application, including but not limited to 50 to 200 microns or 50 to 150 microns or 75 to 125 microns, for example, for some assembly applications such as auto assembly or woodworking assembly.

The compositions of this invention can provide desirable properties for a variety of applications. In certain embodiments, the compositions of this invention are suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

In one embodiment, any of the adhesive compositions of the invention can be selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, hygiene core integrity adhesive, packaging adhesive, and hygiene core integrity adhesive.

In some embodiments, such as pressure sensitive adhesives, the curable compositions of the present invention can be characterized by adhesive strength by 180-degree peel test e.g. according to ISO 8510-2-2006 Part 2 at 5 mm/sec or PSTC-101, cohesive strength and/or temperature resistance by static shear hold power testing (room temperature or elevated temperature, e.g., 40° C. or 70° C.) by PSTC-107 and/or by shear adhesion failure temperature (SAFT) by PSTC-17.

In one embodiment, the articles of manufacture of the invention can be coating compositions.

The compositions of the present invention may be prepared according to any suitable method, techniques and equipment. For example, the components of the composition may be blended in a mixer, an extruder, an aluminum can, and/or at the point of application, e.g. a head mixing system. In some cases, the components of the composition may be blended, optionally with a solvent, to form a mixture, which can then be cast onto a backing or other substrate and dried or cured or partially cured to form an article comprising the curable composition.

Furthermore, the composition may be shaped into a desired form, such as a tape or sheet, by an appropriate technique including casting, extrusion, or roll coating techniques (gravure, reverse roll, etc.). Alternatively, the composition may be applied to a substrate using conventional adhesive application equipment recognized in the art, e.g. curtain coating, slot-die coating, wire-wound rod coating, gravure coating, roll coating, knife coating, hot or "warm" melt coating. The composition may be applied as either a continuous or discontinuous coating or film or layer or sprayed through different nozzle and/or head configurations at different speeds using typical application equipment. The application may be followed by drying or heat treatment.

In another embodiment, the curable adhesive of the present invention is a laminating adhesive for flexible packaging.

After formulation, the curable adhesive can be applied to a substrate and subsequently laminated to another substrate. Suitable substrates include but are not limited to textile, fabric, mesh, film, poly(acrylonitrile butadiene styrene) (ABS), polypropylene (PP), glass-filled PP, talc-filled PP, impact-modified PP, polycarbonate (PC), PC-ABS, biaxially oriented polypropylene (BOPP), thermoplastic polyolefin (TPO) compounds, pigmented TPO compounds, filled TPO compounds, rubber-modified TPO compounds, paper, glass, plastic, metal, PVC (polyvinyl chloride), PET (polyethylene terephthalate), modified PET such as PETG (PET modified with 1,4-cyclohexanedimethanol) and PCTG, Mylar™ plastic, aluminum, leather, synthetic leather, vinyl, nonwoven materials, foams, painted surfaces, printed surfaces, thermosets, thermoplastics, polymer films such as polyethylene, polypropylene, oriented polyethylene, oriented polypropylene; metallized plastic films; aluminum foil; wood; metals such as aluminum, steel or galvanized sheeting; glass; urethane elastomers; primed (painted) substrates, and laminates, blends or coated substrates comprising at least one of these materials. Any of these substrates may be untreated, corona treated, chemically treated, plasma treated, flame treated, rubber-modified, impact-modified, filled with e.g. talc or glass, pigmented with e.g. carbon black, chromium oxide or titanium oxide, or otherwise modified as known by those skilled in the art to provide improved properties to the substrate.

The curable adhesive can be coated onto a substrate using techniques known in the art, for example, by spraying, draw-down, roll-coating, brushing, nozzle dispensing, printing, etc. and subsequently laminated to another substrate manually or by a roll-to-roll laminating machine. The coating and laminating process may be done at room temperature or elevated temperatures.

In some embodiments, the curable compositions of the present invention can be characterized by lap shear testing: ASTM D3163-01(2014) Standard Test Method for Determining Strength of Adhesively Bonded Rigid Plastic Lap-Shear Joints in Shear by Tension Loading. Impact strength can also be measured by any method known in the art, for example, by pendulum or ball drop impact tests.

In some embodiments, the curable compositions of the present invention can be used in flexible packaging and characterized by tests such as DIN ISO 53357 Internal Adhesion, DIN ISO 55529 Sealed Seam Strength, DIN 53357 Bonding Adhesion, DIN 53504 Elongation at Tear and Tearing Tension, ASTM D1003 Transparency of film, ASTM D2578 Wetting Tension of Film Surface, ASTM F1249 Water Vapor Transmission Rate, and/or ASTM F2622 or D3985 Oxygen Transmission Rate.

The inventive compositions can exhibit improved heat resistance and/or improved adhesion over time, particularly after heat aging, as evidenced by tests such as elevated temperature aging of the adhered articles comprising the inventive compositions, followed by lap shear testing, by fiber tear testing, by peel testing, by peel adhesion failure temperature (PAFT) testing, by shear adhesion failure temperature (SAFT) testing, and/or by shear hold power testing at elevated temperatures such as 40° C., 60° C., 70° C., 85° C., 95° C., 105° C., 120° C. The adhered articles comprising the compositions of the invention can also exhibit improved humidity resistance as evidenced, for example, by aging at 95 to 100% relative humidity at 40° C. for 24 to 144 hours followed by any of the above listed adhesion and cohesion tests at room temperature and/or at elevated temperature.

Improved chemical resistance of the compositions can be shown by reduced degradation of adhesive and cohesive strength after exposure to selected chemicals. In general, resistance to solvents, water, foods, cleaning products and other chemicals can be measured by direct exposure up to and including immersion for a period of time followed by adhesive and cohesive testing as described above to compare to pristine material testing. Visual observations are made in general for degradation of articles during/after exposure. Uptake of the test fluid can be measured gravimetrically or spectroscopically.

EXAMPLES

Example 1

Synthesis of Fumarated Rosins

Fumarated rosins having 2, 4, 6, and 8 secondary carboxyl functionalities are prepared by reacting respectively rosin acid, rosin triethylene glycol ester, rosin glycerol ester, and rosin pentaerythritol ester with fumaric acid at molar ratios of 1:1, 1:2, 1:3, and 1:4 respectively at 100-180° C. for five hours. After cooling, amorphous solids with good solubility are obtained.

Example 2

Synthesis of Silane Functionalized Rosins

Silane Functionalized rosins are prepared by reacting respectively the fumarated rosins prepared in Example 1 with 3-glycidoxypropyl-triethoxysilane at molar ratios of 1:2, 1:4, 1:6, and 1:8 respectively at 160° C. for six hours. After cooling, amorphous solids with good solubility are obtained.

In a 250 mL round bottom flask was charged 98.10 g Lewisol™ 28-M, then heated to 160° C. 19.62 g 3-glycidoxypropyl-triethoxysilane was quickly added. The mixture was stirred for 5 hours before the product was poured into an aluminum pan to cool.

Alternatively, silane functionalized rosins are prepared by reacting respectively the fumarated rosins prepared in Example 1 with 3-aminopropyltriethoxysilane at molar ratios of 1:2, 1:4, 1:6, and 1:8 respectively in the presence 5 mol % 4-dimethylaminopyridine at 120° C. for six hours. After cooling, amorphous solids with good solubility are obtained.

Example 3

Synthesis of TMCD Polyester Polyol (EX2515-189)

A 2-L kettle with a four-neck lid was equipped with a mechanical stirrer, a thermocouple, a heated partial condenser (115° C.), a Dean-Stark trap, and a chilled condenser (15° C.). The kettle was charged with 2,2,4,4-tetramethyl-cyclobutane-1,3-diol (TMCD) (427.9 g), 2-methyl-1,3-propanediol (MPDiol) (178.3 g), trimethylolpropane (TMP) (72.01 g), isophthalic acid (IPA) (581.5 g), adipic acid (AD) (219.2g), and the acid catalyst, Fascat-4100 (Arkema Inc.) (1.89 g). The mixture was allowed to react under a nitrogen blanket. The temperature was ramped up from room temperature to 140° C. over 80 minutes. Once reaching the meltdown temperature of 140° C., the temperature was increased from 140 to 230° C. over 2.25 hours. Once the maximum temperature was reached, the subsurface nitrogen sparge was initiated and the temperature held until a low acid number was achieved. The resin was sampled for acid number analysis with a final target of <5 mgKOH/g. After achieving an acid number of 4.2 and high viscosity, the resin was allowed to cool to 190° C. before being poured into aluminum pans. The resin was cooled and a solid product collected.

Using the same method as above, a series of resins having various glass transition temperatures (Tg's) was synthesized. The compositions of the synthesized polyesters are listed in Table 1, and the resin properties are listed in Table 2, in which CHDA is 1,4-cyclohexanedicarboxylic acid, Mn is number average molecular weight, and Mw is weight average molecular weight.

TABLE 1

Resin Compositions of TMCD Polyesters with Various Tg's

| | Resin Composition as Charged | | | | | | | |
|---|---|---|---|---|---|---|---|---|
| | Eq. Ratio Based on Total diols & triol (%) | | | Eq. Ratio Based on Total diacids (%) | | | | eq ratio of |
| Notebook Number | TMCD | MPDiol | TMP | IPA | CHDA | AD | Dimer Acid | OH/COOH (R) |
| EX4198-027 | 45.0 | 45.0 | 10.0 | | | 100.0 | | 1.30 |
| EX3449-021 | 43.0 | 43.0 | 14.0 | 50.0 | | 30.0 | 20.0 | 1.30 |
| EX3449-016 | 43.0 | 43.0 | 14.0 | 50.0 | | 30.0 | 20.0 | 1.20 |
| EX2515-181 | 43.0 | 43.0 | 14.0 | 70.0 | | 25.0 | 5.0 | 1.15 |
| EX2515-190 | 43.0 | 43.0 | 14.0 | 70.0 | | 30.0 | | 1.15 |
| EX2515-189 | 51.6 | 34.4 | 14.0 | 70.0 | | 30.0 | | 1.15 |
| EX2515-200 | 55.0 | 35.0 | 10.0 | 70.0 | | 30.0 | | 1.15 |
| EX2515-167 | 43.0 | 43.0 | 14.0 | 70.0 | 30.0 | | | 1.15 |
| EX2515-171 | 51.6 | 34.4 | 14.0 | 100.0 | | | | 1.15 |
| EX2515-172 | 60.2 | 25.8 | 14.0 | 100.0 | | | | 1.15 |
| EX2515-174 | 86.0 | | 14.0 | 100.0 | | | | 1.15 |

TABLE 2

| Resin Properties of TMCD Polyesters with Various Tg's | | | | | |
|---|---|---|---|---|---|
| | Resin Properties | | | | |
| Notebook Number | Acid Number Analyzed | OH Number Analyzed | Tg, C. | Mn | Mw |
| EX4198-027 | <1.0 | 92.8 | −42.00 | 2579 | 6876 |
| EX3449-021 | 4.0 | 88.8 | −21.1 | 2296 | 6231 |
| EX3449-016 | 1.8 | 58.5 | −13.5 | 4345 | 15532 |
| EX2515-181 | 3.1 | 53.1 | 21.4 | 4612 | 41445 |
| EX2515-190 | 2.1 | 50.1 | 30.4 | 5406 | 62233 |
| EX2515-189 | 3.1 | 49.2 | 36.3 | 5042 | 56060 |
| EX2515-200 | 6.1 | 53.7 | 38.0 | 4477 | 41765 |
| EX2515-167 | 7.4 | 45.9 | 55.2 | 4676 | 46763 |
| EX2515-171 | 7.2 | 48.4 | 74.8 | 4957 | 38786 |

TABLE 2-continued

| Resin Properties of TMCD Polyesters with Various Tg's | | | | | |
|---|---|---|---|---|---|
| | Resin Properties | | | | |
| Notebook Number | Acid Number Analyzed | OH Number Analyzed | Tg, C. | Mn | Mw |
| EX2515-172 | 9.0 | 44.1 | 83.9 | 4676 | 46763 |
| EX2515-174 | 23.4 | 46.1 | 105.7 | 2902 | 17327 |

Example 4

Synthesis of All-Aliphatic TMCD Polyester Polyols

Using the same method as described in Example 3, three all-aliphatic polyesters were prepared using hexahydrophthalic anhydride (HHPA) as the diacid. Their compositions and properties are listed in Table 3.

TABLE 3

| All-Aliphatic TMCD Polyesters | | | | | | | | | | |
|---|---|---|---|---|---|---|---|---|---|---|
| | Polyester Resin Composition as Charged | | | | | | | | | |
| | Eq. Ratio Based on Total diols & triol (%) | | | Diacid | eq ratio of | Resin Properties | | | | |
| Polyester | NPG | TMCD | TMP | HHPA | OH/COOH | AN | OH# | Tg, C | Mn | Mw |
| EX4198-108 | 45 | 45 | 10 | 100 | 1.4 | 1.4 | 124.7 | 29.74 | 1428 | 2415 |
| EX4198-114 | 42.5 | 42.5 | 15 | 100 | 1.4 | 2.0 | 129.9 | 28.82 | 1381 | 2499 |
| EX4198-117 | 34 | 51 | 15 | 100 | 1.4 | 1.0 | 118.8 | 35.47 | 1497 | 2780 |

Example 5

Synthesis of TMCD Polyester Diols

Using the same method as described in Example 3, a series of polyester diols was prepared. These polyesters are linear without a branching agent such as TMP; thus, they have only two OH functional groups. The polyesters except the first one (EX4198-140) have the same compositions but decreasing R value (equivalent ratio of total OH/total COOH) from 1.3 to 1.1, which leads to increasing molecular weights. The compositions and the resin properties of the synthesized polyesters are listed in Table 4.

TABLE 4

TMCD Polyester Diols with Various Molecular Weights

| Notebook | Resin Composition as Charged: Eq. Ratio Based on Total Alcohols (%) | | | Eq. Ratio Based on Total Acids (%) | | eq ratio OH/COOH | Acid | | | |
|---|---|---|---|---|---|---|---|---|---|---|
| Number | TMCD | NPG | MPDiol | AD | IPA | (R) | Number | Tg, C | Mn | Mw |
| EX4198-140 | 50 | 50 | | 100 | | 1.3 | <0.5 | −40.4 | 1586 | 3082 |
| EX2515-118 | 50 | | 50 | | 100 | 1.3 | <1.0 | 40.3 | 1650 | 2975 |
| EX2515-119 | 50 | | 50 | | 100 | 1.25 | <1.0 | 47.9 | 2007 | 4017 |
| EX2515-120 | 50 | | 50 | | 100 | 1.2 | 3.5 | 51 | 1915 | 4061 |
| EX2515-121 | 50 | | 50 | | 100 | 1.15 | 5.3 | 59.5 | 2791 | 5752 |
| EX2515-122 | 50 | | 50 | | 100 | 1.1 | 8.2 | 67 | 3276 | 7961 |

Example 6

Preparation of Solvent-Borne Adhesive

A polyester polyol solution (30% solids) is first prepared by mixing polyester EX3449-021 in ethyl acetate. An adhesive is then prepared by mixing the polyester polyol solution with each silane functionalized rosin prepared in Example 2 at an equivalent ratio of OH/ethoxy=1/3. The resulting adhesive is then applied to a polymer film substrate. After the solvent is evaporated, the coated film is laminated with another polymer film. The laminated films are then tested for peel strength over a period of 7 days at room temperatures or slightly elevated temperatures (e.g. 30-50° C.). Such an adhesive has utilities in, for example, flexible packaging, auto interior, and wood working.

Example 7

Preparation of Hot Melt Adhesive

A prepolymer is prepared by mixing polyester polyol EX2515-120 with each silane functionalized rosin prepared in Example 2 at an equivalent ratio of OH/ethoxy=1/3 at 80 ° C. After cooling, the resulting solid prepolymer is used as a moisture-curable hot melt adhesive. The adhesive is heated to 120° C., and the melt is applied to a polymer film and subsequently laminated with another polymer film. The laminated films are then tested for peel strength over a period of 7 days at room temperatures or slightly elevated temperatures (e.g. 30-50° C.). Such a hot melt adhesive has utilities in, for example, building & construction, automotive, and wood working.

It is understood that the foregoing description is that of the preferred embodiments of the invention and that various changes and modifications may be made thereto without departing from the spirit and scope of the invention as defined in the appended claims.

What is claimed is:

1. A silane functionalized rosin composition which comprises a compound of Formula 1:

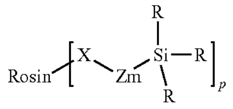

1 wherein X is:

(i) a heteroatom, or (ii) either C(O)O or C(O)NH;

Z is a linear carbon chain having the formula $(CH_2)_n$, a branched hydrocarbon, a hydroxyl group-substituted hydrocarbon, a divalent ether moiety of the formula $(CH_2)_n$—O—$(CH_2)_n$, or a cycloaliphatic hydrocarbon group; each n is an integer of 2 to 4;

each R is independent selected from the group consisting of alkoxy, OH, H, or alkyl, and wherein at least one of R is alkoxy or OH on each Si atom;

p is an integer of from 1 to 8;

the silane functionalized rosin is produced by reaction of a carboxyl functionalized rosin and a functional silane, the carboxyl functionalized rosin is a cycloaddition adduct produced by reaction of: (A) a rosin ester, and (B) an ethylenically unsaturated dicarboxylic acid, or anhydride, to thereby form an intermediate, and then reaction of the intermediate with a silane-containing carboxyl-reactive group, and the rosin ester comprises one or more of rosin triethylene glycol ester, rosin glycerol ester, and rosin pentaerythritol ester.

2. The silane functionalized rosin composition of claim 1, wherein the cycloaddition adduct is produced by reaction of the rosin acid residue, and wherein the rosin acid residue comprises abietic acid, levopimaric acid, or a combination thereof.

3. The silane functionalized rosin composition of claim 1, wherein the ethylenically unsaturated dicarboxylic acid or anhydride comprises one or more of fumaric acid, maleic acid, maleic anhydride, dimethyl fumarate, and dimethyl maleate.

4. The silane functionalized rosin composition of claim 1, wherein the functional silane is selected from:

a) one or more of 3-glycidoxypropyltriethoxysilane, aminomethyltrimethoxysilane, 3-aminopropyltrimethoxysilane, 3-aminoisobutyltrimethoxysilane, 2-hydroxyethyltrimethoxysilane, and 2-(3,4-epoxycyclohexyl) ethyl-trimethoxysilane, or b) an alkoxysilane compound comprising one or more glycidyl, epoxy, amino, or hydroxyl functionalities.

5. The silane functionalized rosin composition of claim 1, comprising:

about 4 to about 70 weight percent of the silane functionalized rosin, about 10 to about 90 weight percent of at least one polymer, about 0 to about 70 weight percent of at least one thermoplastic tackifying resin, about 0 to about 50 weight percent of at least one wax, about 0 to about 60 weight percent of at least one oil or plasticizer, about 0.5 to about 3 weight percent of at least one stabilizer, and about 0 to about 70 weight percent of at least one filler.

6. A vulcanized composition, wherein the composition is obtained by vulcanizing the composition of claim 4.

7. The silane functionalized rosin composition of claim 1, which comprises:

(A) from about 10% to about 60% based on the weight of the composition of at least one isocyanate;

(B) about 10% to about 60% based on the weight of the composition of the silane functionalized rosin;

(C) about 10% to about 80% based on the weight of the composition of at least one polyester or polyether polyol or a mixture thereof;

(D) from 0% to about 10% based on the weight of the composition of a blowing agent;

(E) from 0% to about 5% based on the weight of the composition of a surfactant; and (F) from about 0.02% to about 5.0% based on the weight of the composition of a urethane catalyst.

8. The silane functionalized rosin composition of claim 1, further comprising:

an hydroxyl functional polymer having a hydroxyl number of 10 mgKOH/g to 200 mgKOH/g and a number average molecular weight of 500 g/mol to 10,000 g/mole, and wherein the silane functionalized rosin forms an Si—O—C covalent bond with the hydroxyl functional polymer upon curing.

9. The silane functionalized rosin composition of claim 8, wherein the composition has a peel strength of 5 N/25 mm or greater, as measured in accordance with ASTM D1876 (T-peel test) or ISO 4587, or wherein the composition has a lap shear strength of 1 N/mm2 or greater as measured in accordance with ASTM D1002, after having been fully cured between two substrates.

10. The silane functionalized rosin composition of claim 8, wherein the hydroxyl functional polymer is present in an amount of between 30 and 90 weight %, and wherein the silane functionalized rosin is present in an amount of between 10 and 70 weight %, based on the total weight of the composition.

11. The silane functionalized rosin composition of claim 8, wherein the hydroxyl functional polymer is one or more of polyester polyol, polyether polyol, and acrylic polyol.

12. The silane functionalized rosin composition of claim 8, further comprising an organic solvent.

13. A vulcanized composition, obtained by vulcanizing the composition of claim 8.

* * * * *